US008094622B2

(12) United States Patent  
Tamura

(10) Patent No.: US 8,094,622 B2  
(45) Date of Patent: Jan. 10, 2012

(54) MOBILE COMMUNICATION SYSTEM AND METHOD

(75) Inventor: Yoshio Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 450 days.

(21) Appl. No.: 12/389,939

(22) Filed: Feb. 20, 2009

(65) Prior Publication Data

US 2009/0296655 A1 Dec. 3, 2009

(30) Foreign Application Priority Data

Jun. 3, 2008 (JP) ................................. 2008-145894

(51) Int. Cl.
*H04W 36/00* (2009.01)
(52) U.S. Cl. ........................................ 370/331; 370/394
(58) Field of Classification Search ........................ None
See application file for complete search history.

(56) References Cited

U.S. PATENT DOCUMENTS

| | | | | |
|---|---|---|---|---|
| 6,002,686 | A * | 12/1999 | Mitts et al. | 370/394 |
| 7,065,362 | B2 * | 6/2006 | Lee et al. | 455/442 |
| 7,480,243 | B2 * | 1/2009 | Gruhl et al. | 370/235 |
| 7,873,051 | B2 * | 1/2011 | Hindelang et al. | 370/394 |
| 2002/0131434 | A1 | 9/2002 | Vukovic et al. | |
| 2004/0131040 | A1 | 7/2004 | Gruhl et al. | |
| 2006/0215662 | A1* | 9/2006 | Zhang et al. | 370/394 |
| 2007/0041382 | A1 | 2/2007 | Vayanos et al. | |
| 2010/0014485 | A1* | 1/2010 | Henry et al. | 370/331 |
| 2010/0039996 | A1* | 2/2010 | Ohta et al. | 370/328 |

FOREIGN PATENT DOCUMENTS

| | | |
|---|---|---|
| EP | 1 383 292 | 1/2004 |
| JP | 2007-104344 | 4/2007 |
| JP | 2007-110352 | 4/2007 |
| WO | 2006/116620 | 11/2006 |

OTHER PUBLICATIONS

3GPP TS 36.413 V2.0.0 (Nov. 2007); 3rd Generation Partnership Project; Technical Specification Group Radio Access Network; Evolved Universal Terrestrial Access Network (E-UTRAN); S1 Application Protocol (S1AP) (Release 8).
3GPP TS 36.300 V8.3.0 (Dec. 2007); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).
Extended European Search Report with Abstract attached for corresponding European Patent Application No. 09153815.7 dated Aug. 7, 2009.

* cited by examiner

*Primary Examiner* — Min Jung
(74) *Attorney, Agent, or Firm* — Myers Wolin, LLC.

(57) ABSTRACT

A mobile communication system enables data reception in correct order, with regard to a reversed data order caused by a route change in data transfer from a source base station to a target base station and in direct transmission from a gateway to a target base station is provided. In the mobile communication system, at the time of handover processing performed accompanying a movement of the user equipment from the source base station to the target base station, the source base station transfers to the target base station, a part of packet data not yet transmitted to the user equipment, among packet data received from the upper-level device, and when transferring the part of packet data, the source base station assigns transfer start information, indicating a start of transfer, to a header in a top packet of the untransmitted packet data.

8 Claims, 13 Drawing Sheets

FIG. 10A
TEID controller (versus S-eNB)
GTP-SN management memory structure
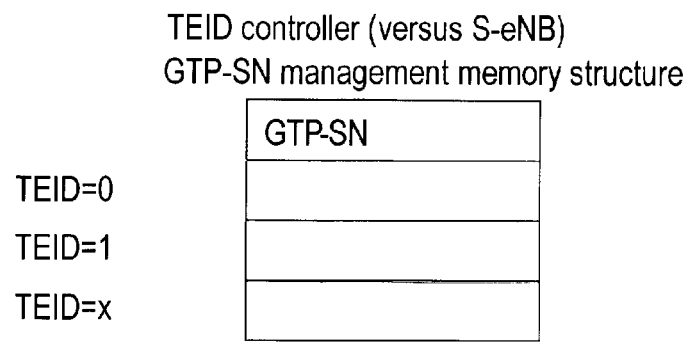
FIG. 10B
TEID controller (versus T-eNB)
GTP-SN management memory structure
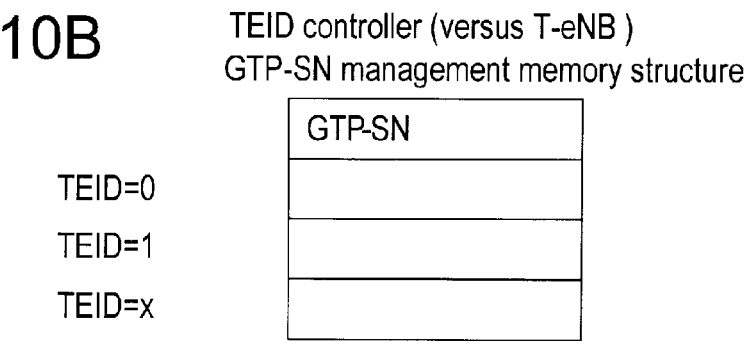
FIG. 10C
Corresponding memory structure for relating TEIDs
|  | Related TEID | S-eNB top TEID present | GW top TEID present | PDCP-SN |
|---|---|---|---|---|
| TEID=0 | | | | |
| TEID=1 | | | | |
| TEID=x | | | | |

MOBILE COMMUNICATION SYSTEM AND METHOD

CROSS-REFERENCE TO RELATED APPLICATIONS

This application is based upon and claims the benefit of priority of the prior Japanese Patent Application No. 2008-145894, filed on Jun. 3, 2008, the entire contents of which are incorporated herein by reference.

FIELD

The present invention relates to a mobile communication system in which a user equipment receives packet data from a gateway through a base station.

BACKGROUND

Among the nodes of a mobile communication network (UTRAN: Universal Mobile Telecommunication Terrestrial Radio Access Network) specified by the 3GPP (3rd Generation Partnership Project), a user equipment (UE), which is also called as a mobile station, receives packet data from a gateway (GW) through a base station.

A handover (HO) between base stations is performed when the user equipment (UE) moves the area position thereof from an accommodating base station (movement-source base station, written as Source evolved Node B: S-eNB) presently receiving packet data to a neighboring base station (movement-target base station, written as Target evolved Node B: T-eNB). Here, as to the reception of downlink packet data from the gateway (GW), the continuity of the received data is desired for the user equipment (UE).

FIG. 1 is a diagram illustrating an exemplary configuration of handover (HO) between base stations in the UTRAN of the mobile communication system.

There is assumed a case that a user equipment (UE) receiving data from a gateway (GW) through a source base station (S-eNB) is presently located in the area of a target base station (T-eNB), accompanying a handover from a source base station (S-eNB).

In such the case, in regard to a packet data in the gateway (GW), the user equipment (UE) is to receive the data through the target base station (T-eNB) as a data transferred from the source base station (S-eNB) to the target base station (T-eNB) and a data transmitted directly from the gateway (GW) to the target base station (T-eNB).

Here, according to the configuration illustrated in FIG. 1, the user equipment (UE) can form reception data in correct order (i.e. sequential), through packet data order arrangement using a packet data convergence protocol (PDCP) between with the gateway (GW).

More specifically, using sequence numbers in the PDCP between the gateway (GW) of a data transmission source and the receiving user equipment (UE), PDCP reordering (sequence reconfiguration) processing is performed in the user equipment (UE). By this, it is possible to guarantee the order of the received packets, even if the packet order is reversed at the time of the output from the gateway (GW) or caused by the base station (eNB) and the IP network located on the halfway.

In contrast, according to the configuration of 3GPP LTE (Long Term Evolution) proposed by the standardization project (3GPP: the 3rd Generation Partnership Project) for the third generation mobile communication system, UTRAN in the mobile communication system illustrated in FIG. 1 becomes as illustrated in FIG. 2.

Namely, the PDCP function having been installed in the gateway (GW) is moved to a base station (eNB). As a result, PDCP is to be exchanged between the base station (eNB) and the user equipment (UE). In this case, there is no protocol for guaranteeing packet order end-to-end between the gateway (GW) and the user equipment (UE).

Therefore, it is no more possible to guarantee the order of the received packets between the gateway (GW) and the user equipment (UE).

To describe in more detail, in the IP network, any IP packet having a predetermined maximum transfer unit size (hereafter referred to as MTU: Maximum Transfer Unit) or larger is divided into packets by the MTU length.

FIG. 3 is a diagram illustrating an example of packet transfer in the above IP network. In FIG. 3, no mechanism is provided to distinguish the order in case of IP packets each having the MTU length or smaller. As a result, packets may possibly arrive after the packet transfer order is reversed due to a large delay through a changed route etc.

In the above case, although packets "0-1" and "0-2" divided by the MTU size can be assembled on the receiving side, it is not possible to assemble undivided packets 1, 2 of which order is reversed.

Therefore, in the IP network transfer, it is not possible to restore to a correct order when the order has been reversed due to the route change etc.

As a result, in the configuration of 3GPP LTE (Long Term Evolution) as illustrated in FIG. 2, a reverse data order may possibly occur in the cases of both data transfer from the source base station (S-eNB) to the target base station (T-eNB) and direct transmission from the gateway (GW) to the target base station (T-eNB) due to the route change. In the above cases, the continuity of data reception may not be obtained in the user equipment (UE).

For example, in the documents 1, 2, descriptions are given on the mobile communication network nodes (UTRAN: Universal Mobile Telecommunication Terrestrial Radio Access Network) specified by the 3GPP.

[Document 1] TS36.300 v 8.3.0 (Chapter 19)
[Document 2] TS36.413 v 2.0.0 (Chapters 8.2.1, 9.1 and 9.2)

SUMMARY

Accordingly, the objective of the present invention is to provide a mobile communication system enabling data reception in correct order, with regard to a reversed data order caused by a route change in data transfer from a source base station (S-eNB) to a target base station (T-eNB) and in direct transmission from a gateway (GW) to a target base station (T-eNB).

In a mobile communication system receiving packet data from a gateway (GW) by a user equipment (UE) through a base station (eNB), at the time of handover processing performed accompanying a movement of the user equipment (UE), receiving sequential packet data from the gateway (GW), from a source base station (S-eNB) to a target base station (T-eNB), when the source base station (S-eNB) transfers to the target base station (T-eNB) a packet data having been received from the gateway (GW) but not transmitted yet to the user equipment (UE), the source base station (S-eNB) assigns transfer start information to a header in the top packet of the untransmitted packet data.

Further, the above gateway (GW) assigns transfer start information to a header in the top packet of the packet data not transmitted yet via the above source base station (S-eNB), among the sequential packet data destined to the user equipment (UE), so as to directly transmit to the above target base station (T-eNB). As a typical example, a GTP (General Packet Radio Services Tunneling Protocol)-U protocol sequence number for use between the gateway (GW) and the source base station (S-eNB) and a GTP-U protocol sequence number for use between the gateway (GW) and the target base station (T-eNB) are used, so as to be related with each other.

At the same time, a transfer start information bit is newly given to the GTP-U header between the gateway (GW) and the source base station (S-eNB), as well as in the GTP-U header between the source base station (S-eNB) and the target base station (T-eNB), so as to guarantee the order.

Further, even in case the top packet is discarded, to distinguish an intermediate packet and a last packet, a sequence number of the packet of which transmission is to start is assigned to each GTP-U header on the basis of the transmission packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10A illustrates a GTP-SN (serial number) management memory relative to the source base station (S-eNB);

FIG. 10B illustrates a GTP-SN management memory relative to the target base station (T-eNB);

FIG. 10C shows an example of a memory for relating TEIDs provided in controller 301 of the target base station (T-eNB);

DESCRIPTION OF EMBODIMENTS

The preferred embodiments are described hereinafter referring to the charts and drawings.

Figure 1:
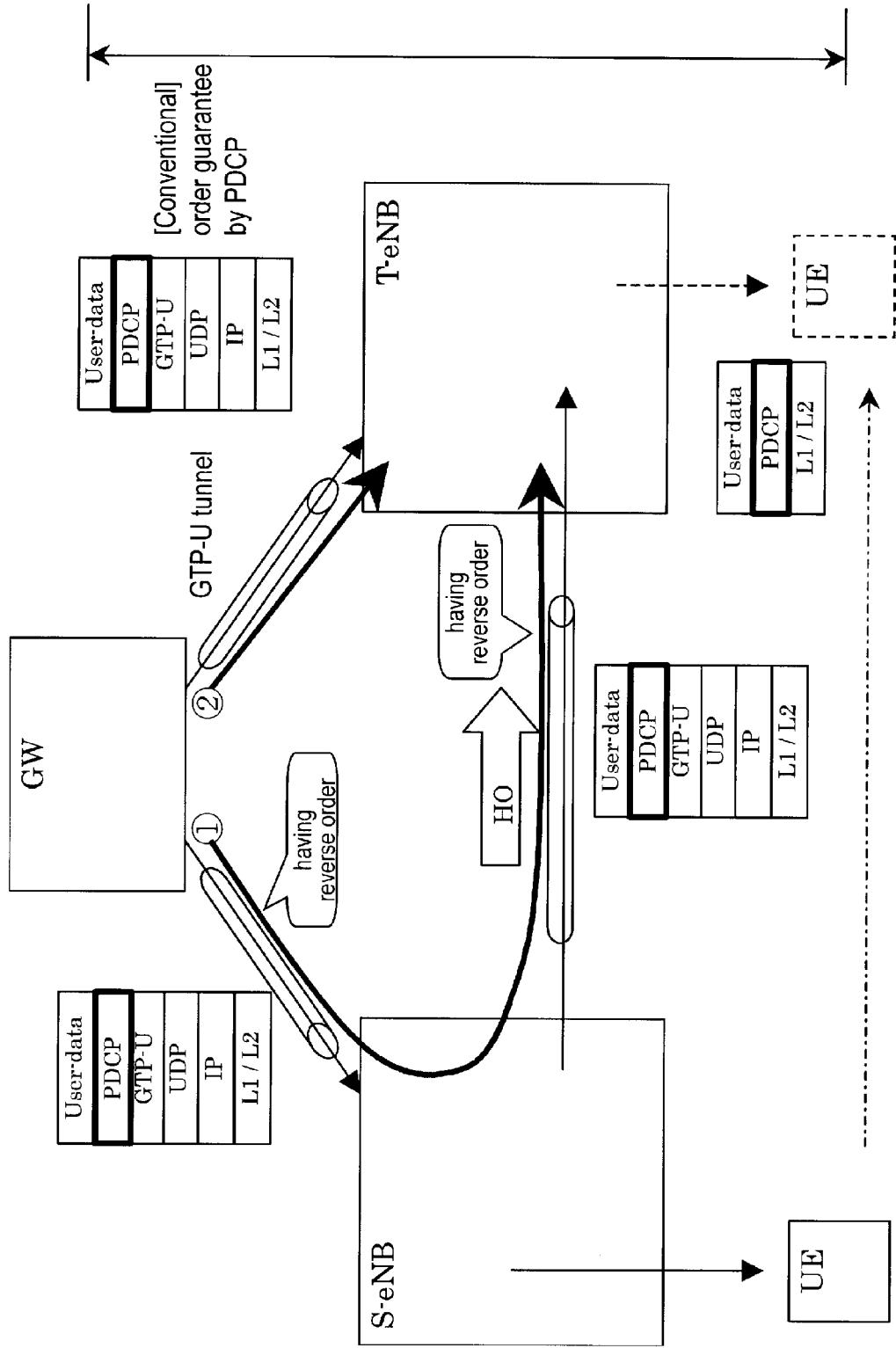
FIG. 1 is a diagram illustrating an exemplary configuration of handover (HO) between base stations in the UTRAN of the mobile communication system.
Figure 2:
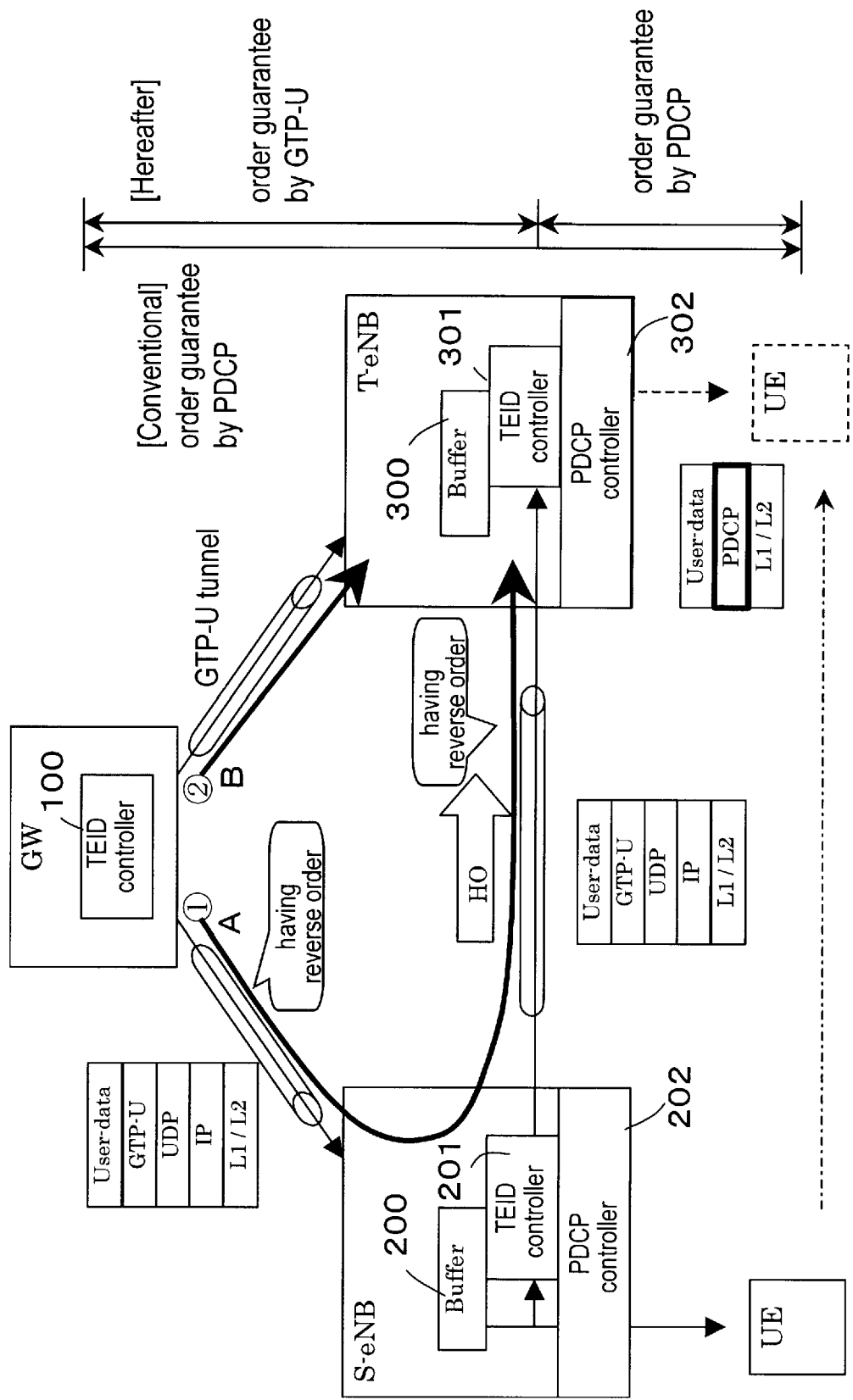
FIG. 2 illustrates UTRAN of the mobile communication system in 3GPP LTE (Long Term Evolution)
Figure 3:
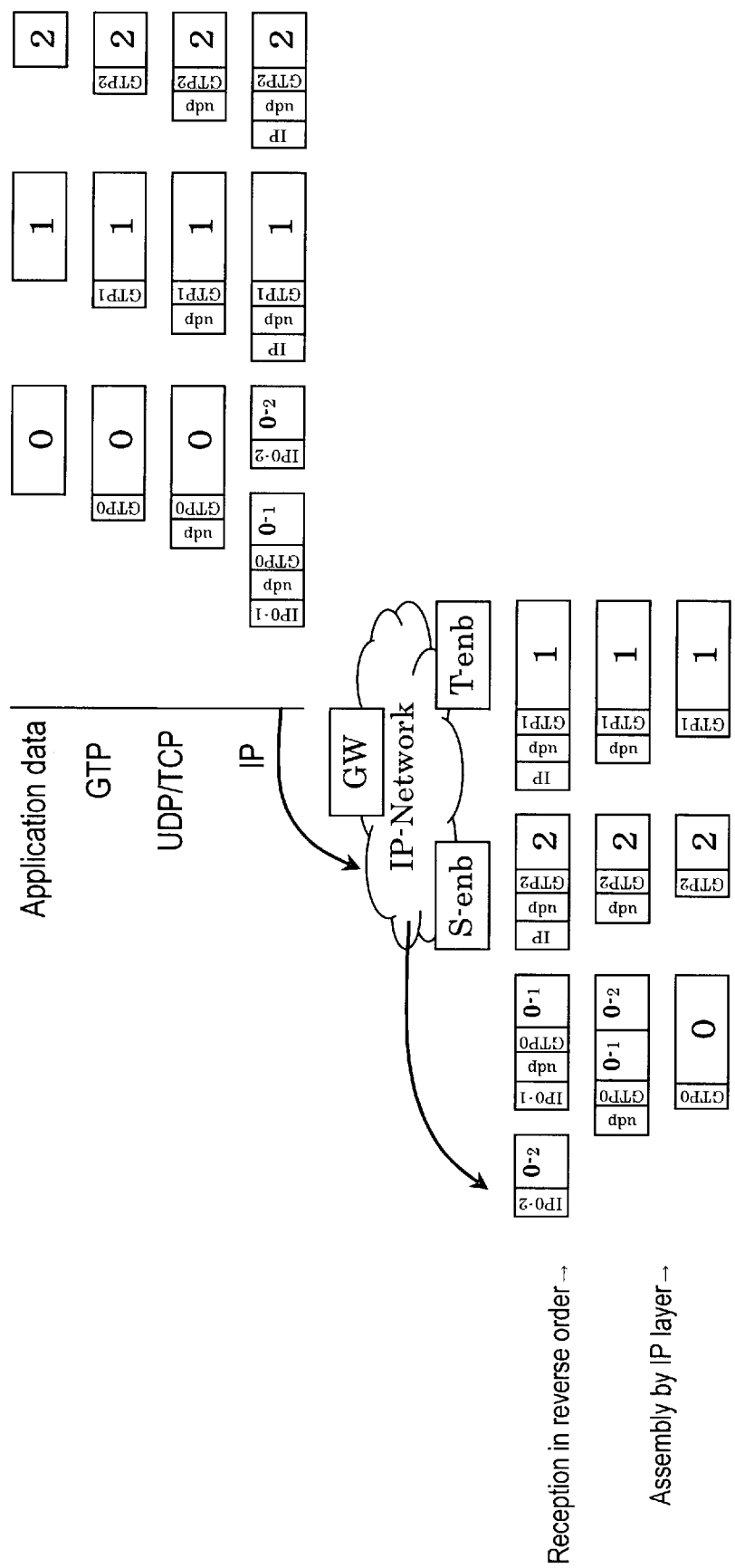
FIG. 3 is a diagram illustrating an example of packet transfer in the IP network.

As an embodiment, in the LTE UTRAN configuration illustrated in the above FIG. 2, there is provided a mechanism taking the following conditions into consideration, so that the reverse of packet order in the data reception does not occur.

In regard to data which are to be transmitted from a gateway (GW), an upper-level unit, and received in a target base station (T-eNB) in the event of handover (HO), two routes (A and B illustrated in FIG. 2) exist: a route through which the data is received via a source base station (S-eNB); and a route through which the data is received directly from the gateway (GW).

Here, according to the 3GPP (the 3rd Generation Partnership Project) LTE, a PDCP control function is shifted to the base station (eNB) side. Further, the GTP-U protocol is applied between the gateway (GW) and the source base station (S-eNB), and a sequence number (transfer order information) is assigned to a transmission packet.

Therefore, when looked from the target base station (T-eNB), the received sequence number used between the gateway (GW) and the source base station (S-eNB) according to the GTP-U protocol of the 3GPP is not limited to the original sequence number assigned by the gateway (GW).

Also, in the target base station (T-eNB), it is not certain whether data respectively received from the gateway (GW) and the source base station (S-eNB) for the first time after the occurrence of the handover are truly top packet data respectively output from the source base station (S-eNB) on the transmission side and the gateway (GW), depending on a network condition.

Therefore, to arrange the order from the top data, it is desired to inform of a data transmitted first from the transmission side. At the same time, in regard to a data transferred from the source base station (S-eNB), because a last packet data is not known also, it is desired to inform the target base station (T-eNB), as the case may be.

Taking such the conditions into consideration, according to the present embodiment, a mechanism to distinguish the continuity of the order is provided. To distinguish the above order continuity, there is provided a mechanism to enable the target base station (T-eNB) to distinguish a top packet of the data which the source base station (S-eNB) has started transmitting to the target base station (T-eNB), and a last transmission packet.

Figure 4:
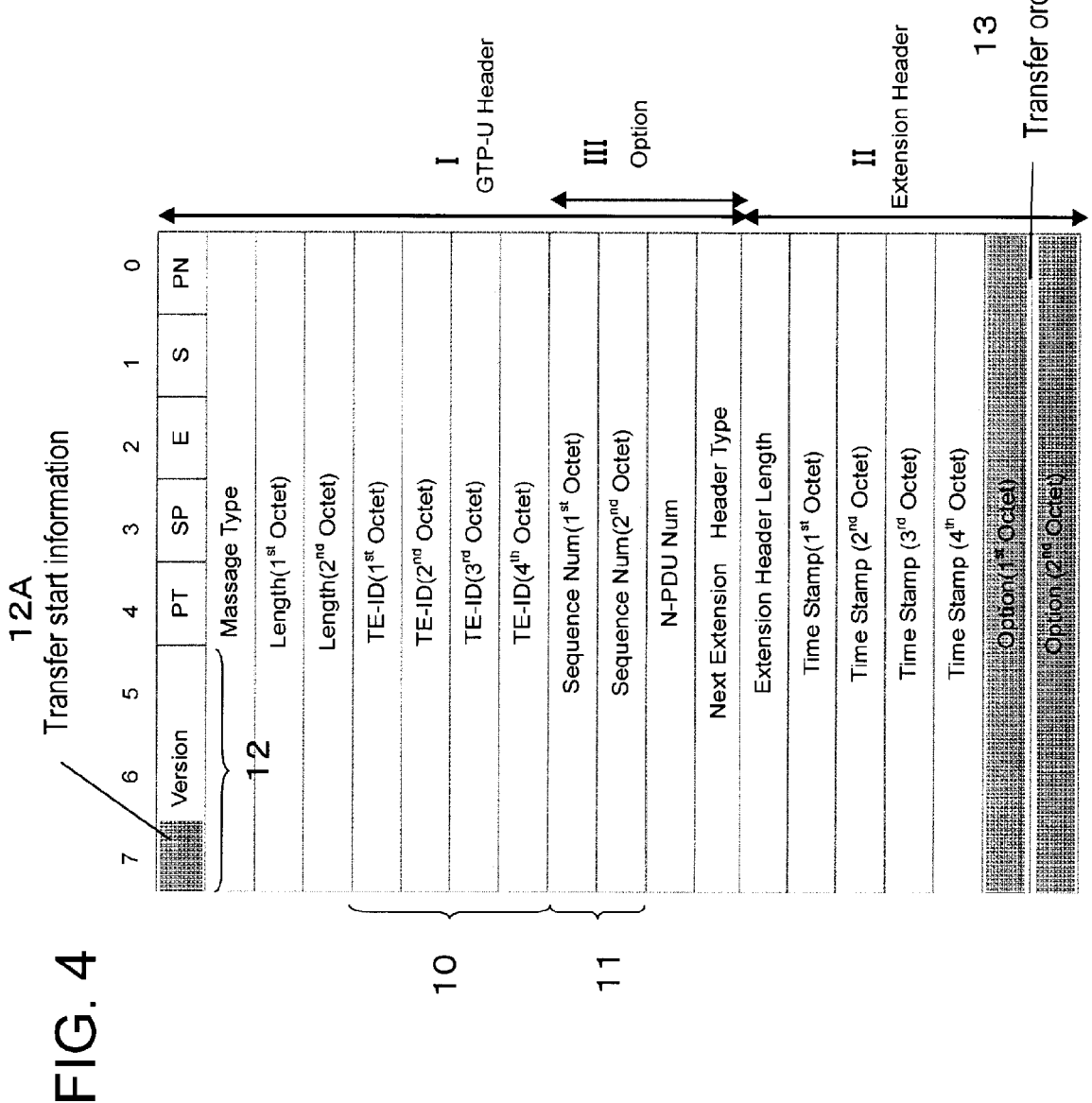
FIG. 4 is a diagram illustrating an exemplary configuration of an embodiment of a header part in a cell format according to the GTP-U protocol specified by the 3GPP, to be used between the gateway and the source base station (and the target base station)

FIG. 4 is a diagram illustrating an exemplary configuration of an embodiment of a header part in a cell format according to the GTP-U protocol specified by the 3GPP (3rd Generation Partnership Project), to be used between the gateway (GW) and the source base station (S-eNB) (and the target base station (T-eNB)).

The header part includes a GTP-U header I and an Extension header II. According to the GTP-U protocol, each tunnel ID (TE-ID) 10 formed of 32 bits for each service is assigned to the GTP-U header I. Further, a serial number 11 is assigned to the packet, according to the GTP-U protocol.

According to a first embodiment, an upper one bit in a 3-bit field (the 5th-7th bits, only in use to identify either the version 0 or 1) 12 in a version field of the GTP-U header I is used, as transfer start information 12A.

When transmitting data to the target base station (T-eNB) the gateway (GW) makes effective (sets "1" on the bit of) the transfer start information 12A in regard to a first data only. By this, it is possible to show that the data concerned is a first packet data for the transmission from the gateway (GW) to the target base station (T-eNB).

Similarly, when transferring to the target base station (T-eNB) data being already buffered or in the middle of buffering in the source base station (S-eNB), the source base station (S-eNB) makes effective the transfer start information 12A in a data to be transmitted first from the source base station (S-eNB) to the target base station (T-eNB), to indicate the data concerned is a first packet data for transmission.

As a use condition of the header part in the cell format according to the above embodiment, the following aspect is employed.

On the transmission side, sequence number 11 indicative of a transmission order is assigned. In the gateway (GW) i.e. the transmission side, if sequence numbers 11 continue to be assigned sequentially and consecutively under the identical tunnel ID (TE-ID) 10 even when the base station (eNB) is changed, the target base station (T-eNB) can arrange the order.

However, because the decision of use of tunnel ID (TE-ID) 10 can freely be made by the reception side, tunnel IDs (TE-IDs) 10 differ between the gateway (GW) and the source base station (S-eNB), between the gateway (GW) and the target base station (T-eNB), and between the source base station (S-eNB) and the target base station (T-eNB), respectively.

To cope with the above-mentioned problem, the following configuration is applied so as to make sequence numbers 11 in the GTP-U header I sequentially consecutive when looked from the target base station (T-eNB), by relating the changed tunnel ID (TE-ID) 10 even if tunnel ID (TE-ID) 10 is changed.

When a base station (eNB) is changed due to a handover, the following mechanism is provided in the gateway (GW). Namely, in regard to sequence number 11 having been requested from the source base station (S-eNB) and assigned to one certain tunnel ID (TE-ID) 10, the gateway (GW) changes tunnel ID (TE-ID) 10 to a tunnel ID (TE-ID) 10 requested from the target base station (T-eNB), and successively assigns sequence numbers following the above sequence number 11.

At the source base station (S-eNB), in regard to each untransmitted data destined to the user equipment (UE), having tunnel ID (TE-ID) 10 which has been in communication with the gateway (GW) at the time of the handover, is changed to have tunnel ID (TE-ID) 10 being requested from the target base station (T-eNB). Subsequently, the source base station (S-eNB) transmits the above data to the target base station (T-eNB) without changing sequence number 11.

At the target base station (T-eNB), each tunnel ID (TE-ID) 10 requested to the gateway (GW) and the source base station (S-eNB) is managed in a unified manner. The target base station (T-eNB) buffers data received from the gateway (GW), and transmits data, received from the source base station (S-eNB) first to the user equipment (UE).

Thereafter, the target base station (T-eNB) successively transmits the data received from the gateway (GW) to the user equipment (UE). At this time, using the PDCP function provided in the target base station (T-eNB), each sequence number, which is transfer order information indicating the order, is newly assigned sequentially and correspondingly to GTP-U sequence number 11.

Figure 5:
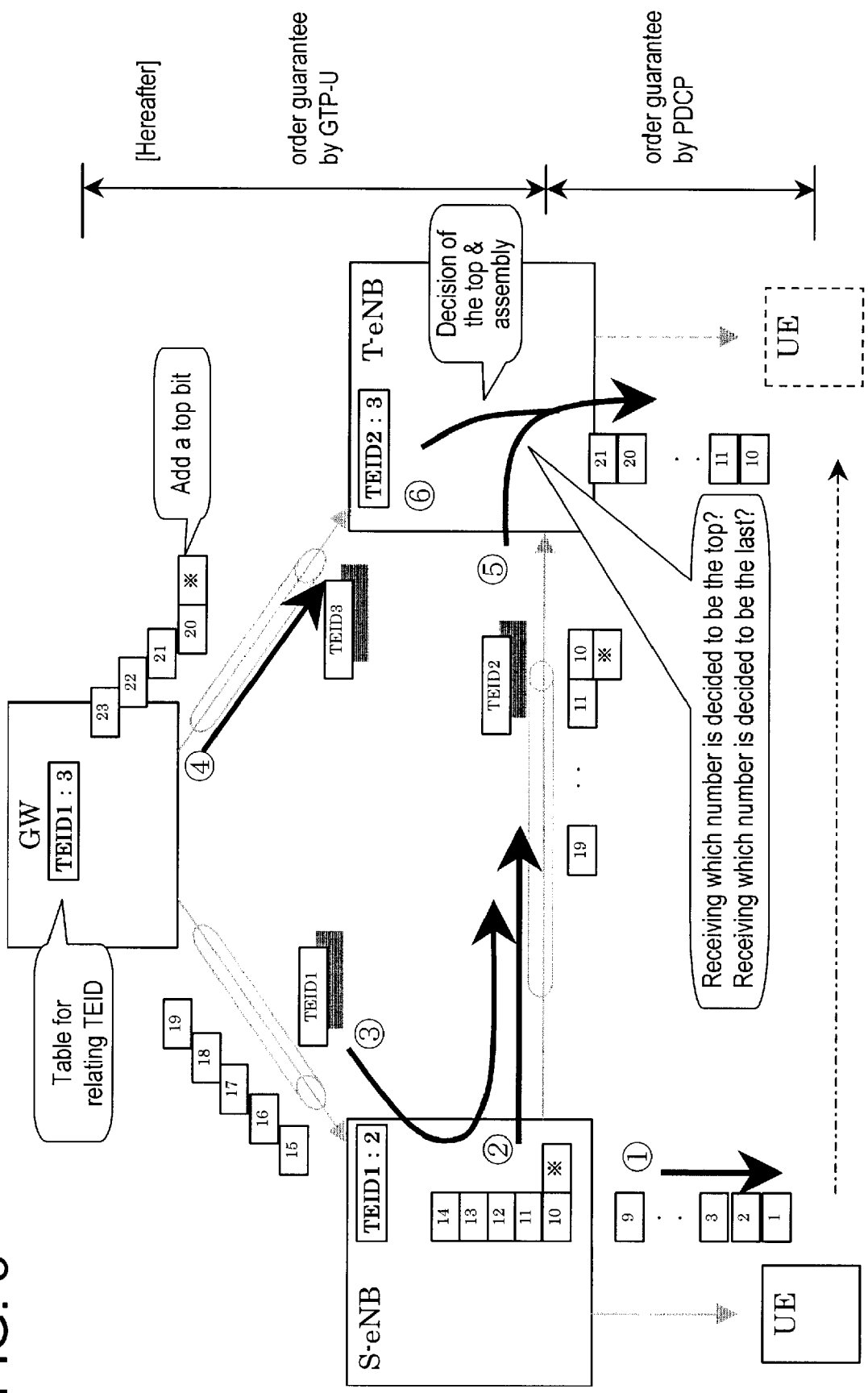
FIG. 5 is a diagram illustrating a typical example of data flow in which the above-mentioned mechanism is applied in the LTE UTRAN configuration illustrated in FIG. 2.

FIG. 5 is a diagram illustrating a typical example of data flow in which the above-mentioned mechanism is applied in the LTE UTRAN configuration illustrated in the above FIG. 2.

Here, in the UTRAN configuration of LTE illustrated in FIG. 2, the gateway (GW) includes a TEID controller 100. Also, the source base station (S-eNB) and the target base station (T-eNB) include buffers 200, 300 and TEID controllers 201, 301, respectively. Further, the source base station (S-eNB) and the target base station (T-eNB) are configured to have PDCP controllers 202, 302, respectively.

In FIG. 5, as a tunnel ID (TEID) between the gateway (GW) and the source base station (S-eNB), {1} is set by a request from the source base station (S-eNB).

In FIG. 5, packet data having GTP-U sequence numbers "1" to "19" are transmitted from the gateway (GW) to the source base station (S-eNB). Among the above data, data whose transmission from the source base station (S-eNB) to the user equipment (UE) is completed are GTP-U sequence numbers "1" up to "9" under TEID: {1} [refer to (1) in FIG. 5].

When handover (HO) processing is started at the above time point caused by the movement of the user equipment (UE), the target base station (T-eNB) requests and establishes a GTP-U TEID: {2} between with the source base station (S-eNB).

Then, the source base station (S-eNB) pairs TEID: {1} with {2}, so as to store into a table of a TEID controller 201 by relating each other. Further, the target base station (T-eNB) requests and establishes a GTP-U TEID: {3} between with the gateway (GW).

By this, the gateway (GW) pairs the TEID: {1} with {3}, so as to store into a table of TEID controller 100 by relating each other. Also, the target base station (T-eNB) pairs the TEID: {2} with {3}, so as to store into a table of TEID controller 301 by relating each other.

Referring back to FIG. 5, when the handover (HO) is started, the source base station (S-eNB) starts transmission to the target base station (T-eNB) from a packet having a serial number "10" of TEID: {1}, using TEID: {2} [refer to (2) in FIG. 5].

At that time, since the serial number "10" is a first data for transmission, the source base station (S-eNB) transmits the data concerned is to the target base station (T-eNB) by setting the uppermost bit in the version field of the GTP-U header to [1].

At the same time, the gateway (GW) starts transmission successively from the "20th" packet of TEID: {1} to the target base station (T-eNB), using TEID: {3} [refer to (4) in FIG. 5].

At that time, since the "20th" packet is a first data for transmission, the gateway (GW) transmits the data concerned to the target base station (T-eNB) by setting the uppermost bit in the version field of the GTP-U header to [1].

Then, the target base station (T-eNB) decides that the data having the GTP-U serial number "10" with the top flag of TEID: {2} assigned thereto is a top data from the source base station (S-eNB). Also, the target base station (T-eNB) decides that the data having the GTP-U serial number "20" with the top flag of TEID: {3} assigned thereto is a top data from the gateway (GW).

Because the target base station (T-eNB) understands that the top packet from the gateway (GW) has the GTP-U serial number "20", the target base station (T-eNB) transmits to the mobile unit (UE) the packets received from the source base station (S-eNB) having the GTP-U serial numbers "10" to "19". Thereafter, the target base station (T-eNB) transmits the packets received from the gateway (GW) having the GTP-U serial numbers "20" and after.

Figure 6:
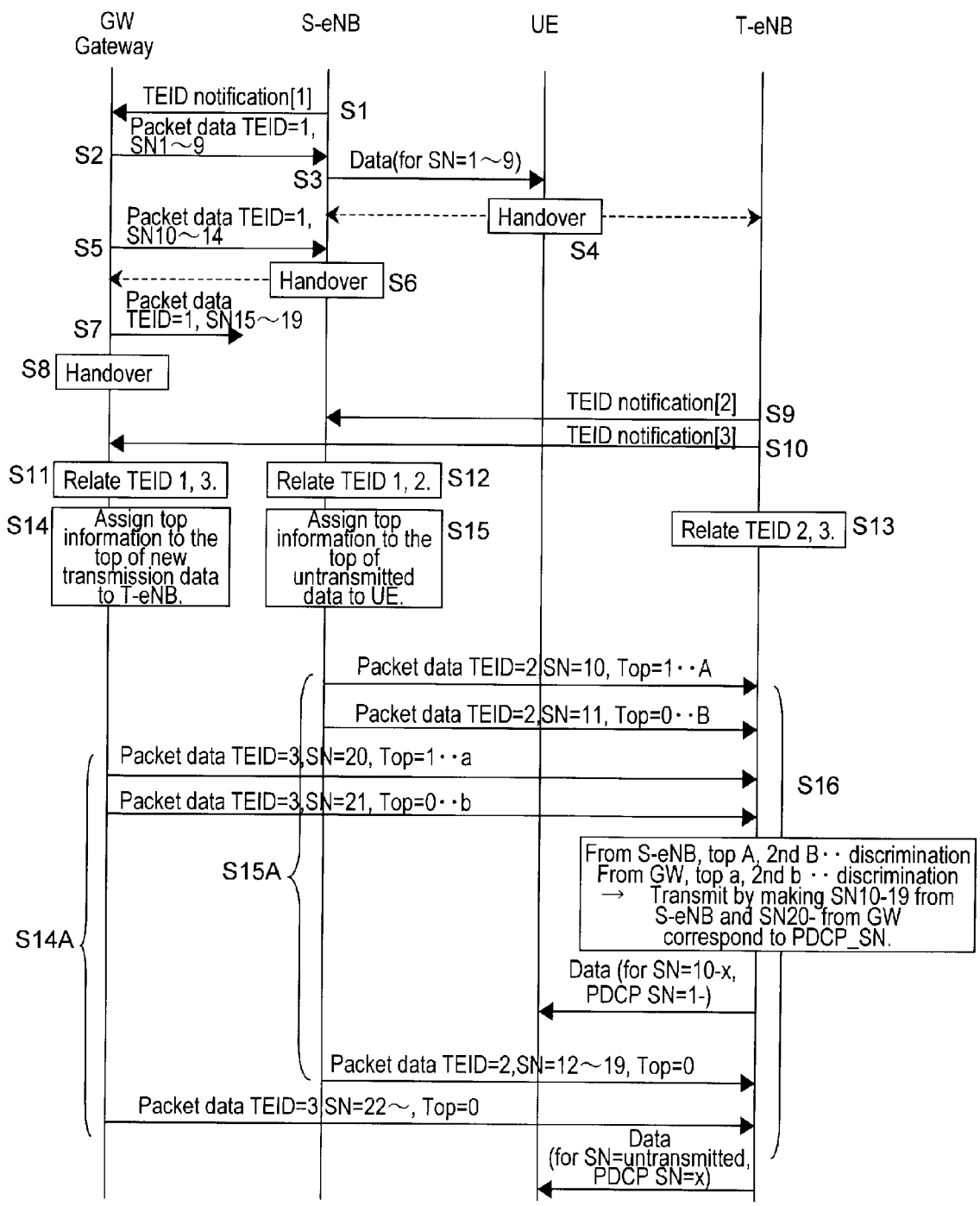
FIG. 6 is a flowchart illustrating a processing flow corresponding to FIG. 5.

FIG. 6 is a flowchart illustrating a processing flow corresponding to FIG. 5.

The source base station (S-eNB) requests the gateway (GW) to set a GTP-U ID (TE-ID) {1} between with the gateway (GW) (step S1).

By this, TEID controller 100 in the gateway (GW) sets the above tunnel ID (TE-ID) {1}.

Here, as illustrated in FIGS. 10A and 10B, TEID controller 100 in the gateway (GW) provides a GTP-SN (serial number) management memory relative to the source base station (S-eNB) (FIG. 10A) and a GTP-SN management memory relative to the target base station (T-eNB) (FIG. 10B).

In each GTP-SN (serial number) management memory, there is registered a GTP serial number having been assigned and set before, on the basis of each tunnel ID (TE-ID).

The above GTP-SN (serial number) management memories illustrated in FIGS. 10A, 10B are also provided in TEID controller 201 of the source base station (S-eNB). Here, in the source base station (S-eNB), the above memories include a GTP-SN management memory relative to the gateway (GW) and a GTP-SN management memory relative to the target base station (T-eNB).

FIG. 10C shows an example of a memory for relating TEIDs provided in controller 301 of the target base station (T-eNB). Corresponding to the related TEID, a top TEID relative to the base station (S-eNB) and a top TEID relative to the gateway (GW) are registered when transfer start information is decided. Further, PDCP controller 302 records a serial number assigned at the time of the packet transfer to the user equipment (UE).

To describe referring back to FIG. 6, corresponding to the tunnel ID (TE-ID) {1}, the gateway (GW) assigns sequence number 11 (refer to FIG. 4) to a packet GTP header I by the GTP-U protocol, so as to store into the GTP-SN management memory illustrated in FIG. 10A. Also, the gateway (GW) transmits the packet having sequence number 11 (refer to FIG. 4) assigned thereto to the source base station (S-eNB) (step S2).

Here, the packet having the sequence number assigned by the GTP-U protocol relative to the tunnel ID (TE-ID) {1} is transmitted to the source base station (S-eNB) (step S2).

Accordingly, the source base station (S-eNB) transfers the packet, transmitted from the gateway (GW), to the user equipment (UE) being presently situated in the area of the source base station (S-eNB) (step S3).

Thereafter, the user equipment (UE) moves, and handover processing is started (step S4). It is assumed that, before the start of the handover processing, packets having sequence numbers "1" to "9" have been transmitted from the source base station (S-eNB) to the user equipment (UE).

A notification of handover is informed from the source base station (S-eNB) to the gateway (GW) (step S6).

Then, before the gateway (GW) recognizes the handover of the user equipment (UE) (step S8), packets having consecutive sequence numbers SN=10 to 19 are transmitted from the gateway (GW) to the source base station (S-eNB) by the GTP-U protocol (steps S5, S7).

According to the handover of the user equipment (UE), the target base station (T-eNB) notifies the source base station (S-eNB) and the gateway (GW) of the requests of tunnel IDs (TE-IDs) {2}, {3}, respectively, so as to establish (steps S9, S10).

On receiving the request notifications of the above tunnel IDs (TE-IDs) {2}, {3}, the gateway (GW) and the source base station (S-eNB) relate the above tunnel IDs (TE-IDs) with the existing tunnel ID (TE-ID) {1} (steps S11, S12).

The gateway (GW) relates the tunnel ID (TE-ID) {1} with the tunnel ID (TE-ID) {3} of which the request has been notified (step S11). Also, the source base station (S-eNB) relates the tunnel ID (TE-ID) {1} with the tunnel ID (TE-ID) {2} of which the request has been notified (step S12).

Figure 7:
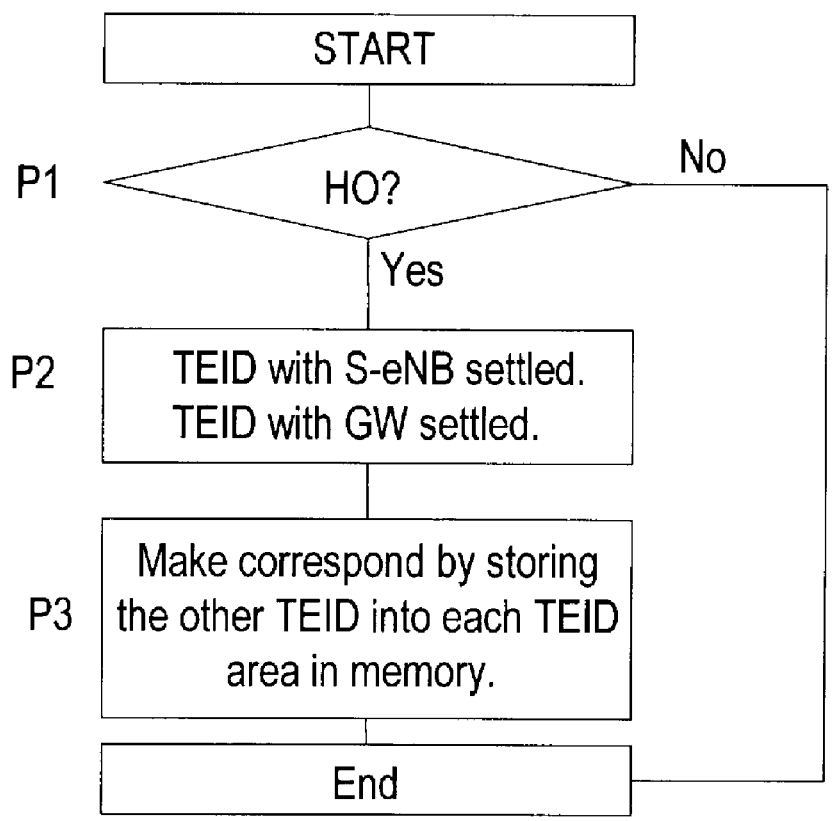
FIG. 7 is a detailed processing flow of requesting and establishing the tunnel ID in the target base station (T-eNB)

FIG. 7 is a detailed processing flow of requesting and establishing the tunnel ID in the target base station (T-eNB).

In FIG. 7, the target base station (T-eNB) decides the existence or non-existence of a handover (process P1), and if the handover exists (Yes in process P1), the target base station (T-eNB) establishes the tunnel ID (TE-ID) {2} between with the source base station (S-eNB), and also establishes the tunnel ID (TE-ID) {3} between with the gateway (GW) (process P2).

Next, the target base station (T-eNB) stores the other related TEID into each TEID memory area provided in the memory of TEID controller 302 of the target base station (T-eNB), as illustrated in FIG. 10C.

As such, the target base station (T-eNB) relates the TEID {2} with the TEID {3} (process P3).

Referring back to the flow illustrated in FIG. 6, as transfer start (top) information, the gateway (GW) sets the bit to [1], illustrated as 12A in FIG. 4, in a packet having a serial number SN=20, among the packet data destined to the target base station (T-eNB) (step S14).

Similarly, the source base station (S-eNB) assigns top information to the packet having a serial number SN=10, among the packet data not transmitted yet to the user equipment (UE) (step S15).

Further, the source base station (S-eNB) transmits the packet having the serial number SN=10 and consecutive packet data having serial numbers SN=1 to 19 to the target base station (T-eNB), using TEID {2} (step S15A).

Similarly, the gateway (GW) further transmits the packet having the serial number SN=20 and consecutive packet data having serial number SN=21 and after, to the target base station (T-eNB), using the tunnel ID {3} (step S14A).

Therefore, from the gateway (GW), the packet having the serial number SN=20 and top information assigned thereto and the packets having the consecutive serial numbers are transmitted under the tunnel ID (TE-ID) {3}. Similarly, from the source base station (S-eNB), the packets which have been received from the gateway (GW) but not transmitted yet to the user equipment (UE) (i.e. the packets having the serial numbers 10-19) are transmitted to the target base station (T-eNB).

Figure 8:
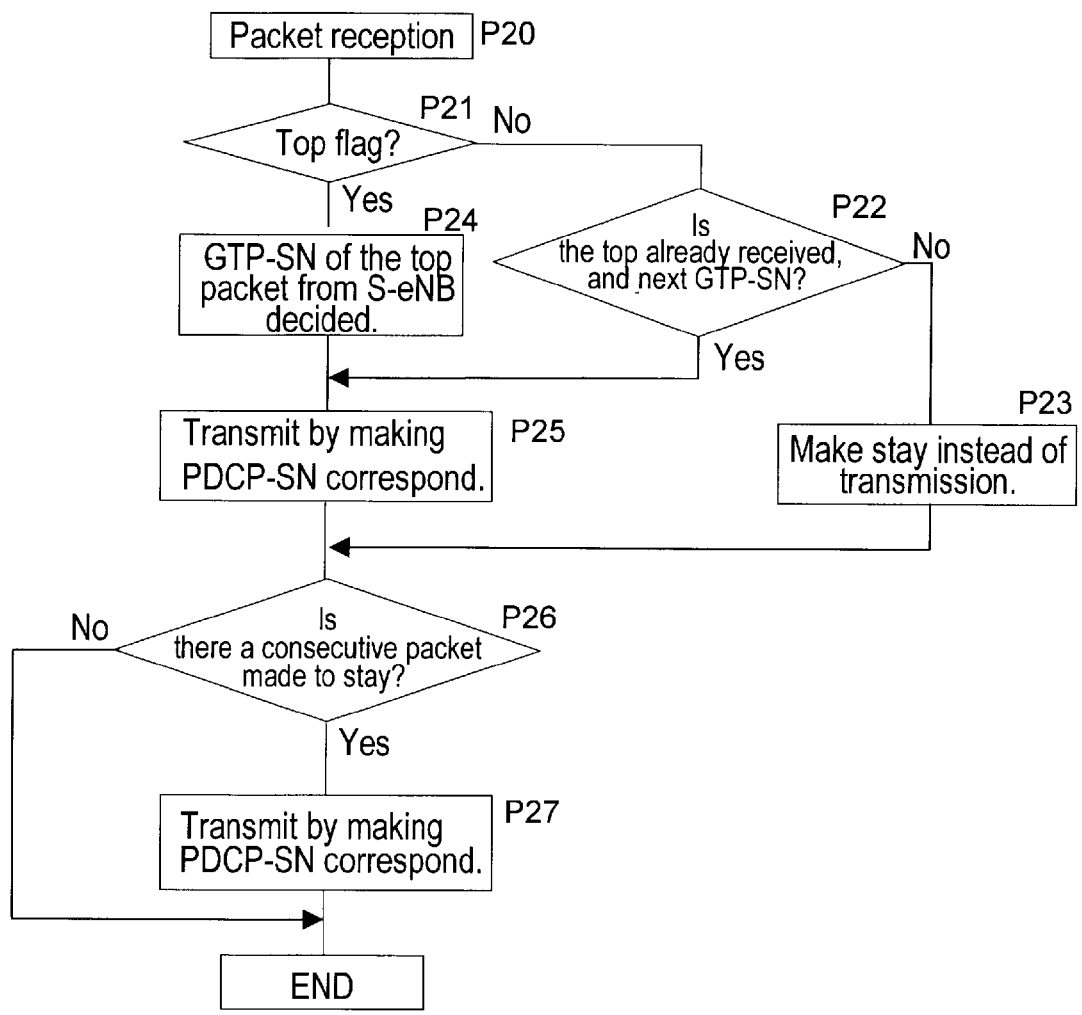
FIG. 8 is a reception processing flow in the target base station (T-eNB) in regard to the packets transmitted from the source base station (S-eNB), corresponding to step S16 of the sequence flow illustrated in FIG. 6.
Figure 9:
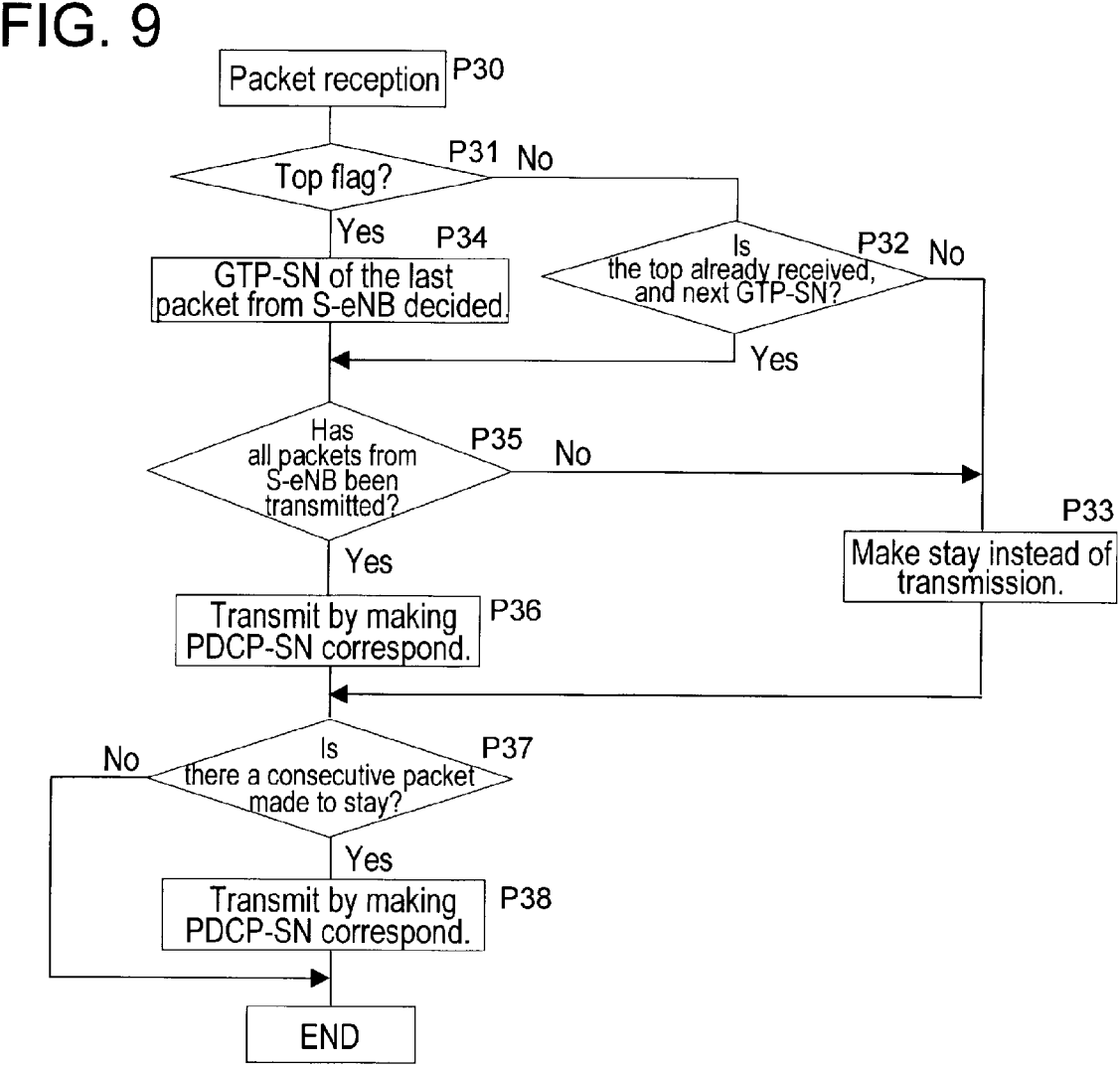
FIG. 9 is a flowchart corresponding to the step S16 in the sequence flow illustrated in FIG. 6.

Now, in regard to the packets thus transmitted from the source base station (S-eNB) and the gateway (GW), the target base station (T-eNB) receives the above packets according to the reception flow illustrated in FIGS. 8 and 9, so as to transfer to the user equipment (UE) (step S16).

FIG. 8 is a reception processing flow in the target base station (T-eNB) in regard to the packets transmitted from the source base station (S-eNB), corresponding to step S16 of the sequence flow illustrated in FIG. 6.

Using TEID controller 301, the target base station (T-eNB) receives the packets having the tunnel ID {2} (GTP serial numbers 10-19) from the source base station (S-eNB) (process P20), and decides whether or not the top packet flag (12A in FIG. 4) indicates effective (process P21).

If the top packet flag is not effective (No in process P21) it is decided whether or not the packet has the next (consecutive) GTP serial number to the top packet having been received (for example, the packet B illustrated in step S15A of FIG. 6) (process P22).

In process P22, if the packet has not the next (consecutive) GTP serial number (No in process P22), the packet concerned is made to stay in buffer 300, instead of being transmitted (process P23). The reason for making the received packet stay in buffer 300 is that, if the packet has no consecutive GTP serial number SN, there is a possible case of a missing transmission packet, a reverse reception order, or a packet transferred from the gateway (GW).

In process P22, if the packet has the next (consecutive) GTP serial number (Yes in process P22), the target base station (T-eNB) transmits the packet to the user equipment (UE), after making a PDCP serial number correspond to the GTP serial number by PDCP controller 302 (process P25).

Further, if there is a packet(s) made to stay in buffer 300 instead of being transmitted (Yes in process P23,26), the target base station (T-eNB) transmits the packet(s) concerned to the user equipment (UE), after making each PDCP serial number consecutively correspond (process P27).

In process P21, if the top flag of the received packet indicates effective (Yes in process P21), a GTP serial number assigned in the gateway (GW) by the GTP-U protocol and included in the top packet from the source base station (S-eNB) becomes known (process P24).

Accordingly, the target base station (T-eNB) transmits the packet concerned to the user equipment (UE), after making a PDCP serial number correspond to the GTP serial number by PDCP controller 302 (process P25).

Further, if there is any packet(s) having a consecutive GTP serial number and staying in buffer 300 (Yes in process P26), the target base station (T-eNB) transmits the packet (s) concerned to the user equipment (UE), after making each PDCP serial number correspond to each GTP serial number by PDCP controller 302, similarly to process P25 (process P27).

Now, in regard to the packets transmitted from the gateway (GW), the target base station (T-eNB) performs reception processing according to a flowchart illustrated in FIG. 9. Here, FIG. 9 corresponds to step S16 in the sequence flow illustrated in FIG. 6.

By TEID controller 301, the target base station (T-eNB) receives each packet having a tunnel ID (TE-ID) {3} from the gateway (GW) (process P30), and checks whether or not the top packet flag (12A in FIG. 4) indicates effective, so as to decide whether or not the packet concerned is a top packet (process P31).

If the top packet flag is not effective (No in process P31) it is decided whether or not the packet has the next (consecutive) GTP serial number to the top packet having been received (for example, the packet b illustrated in step S14A of FIG. 6) (process P22).

In process P32, if the packet has not the next (consecutive) GTP serial number (No in process P32), the packet concerned is made to stay in buffer 300, instead of being transmitted (process P33). The reason for making the received packet stay in buffer 300 is that, if the packet has no consecutive GTP serial number SN, there is a possible case of a missing transmission packet, a reverse reception order, or a packet transferred from the source base station (S-eNB).

In process P32, if the GTP serial number is the next (consecutive) GTP serial number (Yes in process P32), it is decided whether the entire packets from the source base station (S-eNB) have been transmitted to the user equipment (UE) (process P35).

If the entire packets from the source base station (S-eNB) have not been transmitted yet (No in process P35), the packet received is made to stay, instead of being transmitted (process P33).

On the other hand, if the entire packets from the source base station (S-eNB) have been transmitted to the user equipment (UE) (Yes in process P35), the target base station (T-eNB) transmits the packet of interest to the user equipment (UE), after making a PDCP serial number correspond by PDCP controller 302 (process P36).

Further, if there is any packet(s) made to stay in buffer 300 instead of being transmitted (Yes in process P37), the target base station (T-eNB) transmits the packet(s) concerned to the user equipment (UE), after making each PDCP serial number consecutively correspond (process P38).

In the foregoing process P31, if the top flag of the received packet indicates effective (Yes in process P31), a GTP serial number in the last packet from the source base station (S-eNB) becomes known from the GTP serial number assigned to the packet, having the effective top flag, in the gateway (GW) by the GTP-U protocol (process P34).

Accordingly, the target base station (T-eNB) decides whether or not the entire packets from the source base station (S-eNB) have been transmitted to the user equipment (UE) (process P35).

If the entire packets from the source base station (S-eNB) have not been transmitted yet (No in process P35), the packet received is made to stay, instead of being transmitted (process P33).

If the entire packets from the source base station (S-eNB) have been transmitted to the user equipment (UE) (Yes in process P35), the target base station (T-eNB) transmits the packet of interest to the user equipment (UE), after making a PDCP serial number correspond by PDCP controller 302 (process P36).

Further, if there is any packet(s) made to stay in buffer 300 instead of being transmitted (Yes in process P37), the target base station (T-eNB) transmits the packet(s) concerned to the user equipment (UE), after making each PDCP serial number consecutively correspond by PDCP controller 302 (process P38).

According to the above-mentioned embodiment, when the target base station (T-eNB) receives the top data described above from the source base station (S-eNB), the target base station (T-eNB) transmits, to the user equipment (UE), entire packets having smaller numbers than the GTP-U sequence number in the top packet data from the gateway (GW) first.

At that time, PDCP controller 302 assigns PDCP sequence numbers successively from the top packet, so as to transmit to the user equipment (UE). Thereafter, PDCP controller 302 continues to transmit packets received from the gateway (GW) successively from the received top packet.

Here, because the top data from the gateway (GW) can be distinguished by means of the top flag, it is possible to distinguish the last data from the source base station (S-eNB) by comparing the sequence numbers assigned by the GTP-U protocol. Therefore, such an item as a flag indicating the last data is not needed.

In the aforementioned manner, the user equipment (UE) can consecutively receive packets in correct order even at the time of the handover, without addition of a new packet and a control signal.

Here, in regard to packet reception at the time of handover, the following case is assumed as a quasi-normal operation.

When looking from the target base station (T-eNB), in case a middle packet among consecutive packet data from the source base station (S-eNB) arrives with delay caused by a network problem, it is possible to assume an unreceived sequence number if a top data from the source base station (S-eNB) can be distinguished.

Further, if the top data from the gateway (GW) can be distinguished, it is possible to distinguish the number of packet data which are to be received from the source base station (S-eNB) and have not arrived yet. Namely, in regard to data to be transmitted to the user equipment (UE), if PDCP controller 302 in the target base station (T-eNB) makes each PDCP sequence number correspond to each GTP-U protocol sequence number, and sequentially assigns each PDCP sequence number in such a manner as to skip the PDCP sequence number of an unreceived packet data, the data concerned can be transmitted to the user equipment (UE).

It is possible to transmit the packet data received with a delay to the user equipment (UE) by assigning the PDCP sequence number skipped before thereto, and by making the packet data of interest interrupted in the middle of the transmission.

It is possible to cope with a case of the quasi-normal operation when there is a packet data received with a delay, as described above. However, when looking from the target base station (T-eNB), in case that an intermediate packet data from the source base station (S-eNB) is discarded caused by a network problem, the PDCP sequence number is left skipped.

Therefore, in the user equipment (UE), if retransmission is decided to be necessary, retransmission control is to be performed by the upper-level layer.

Figure 11:
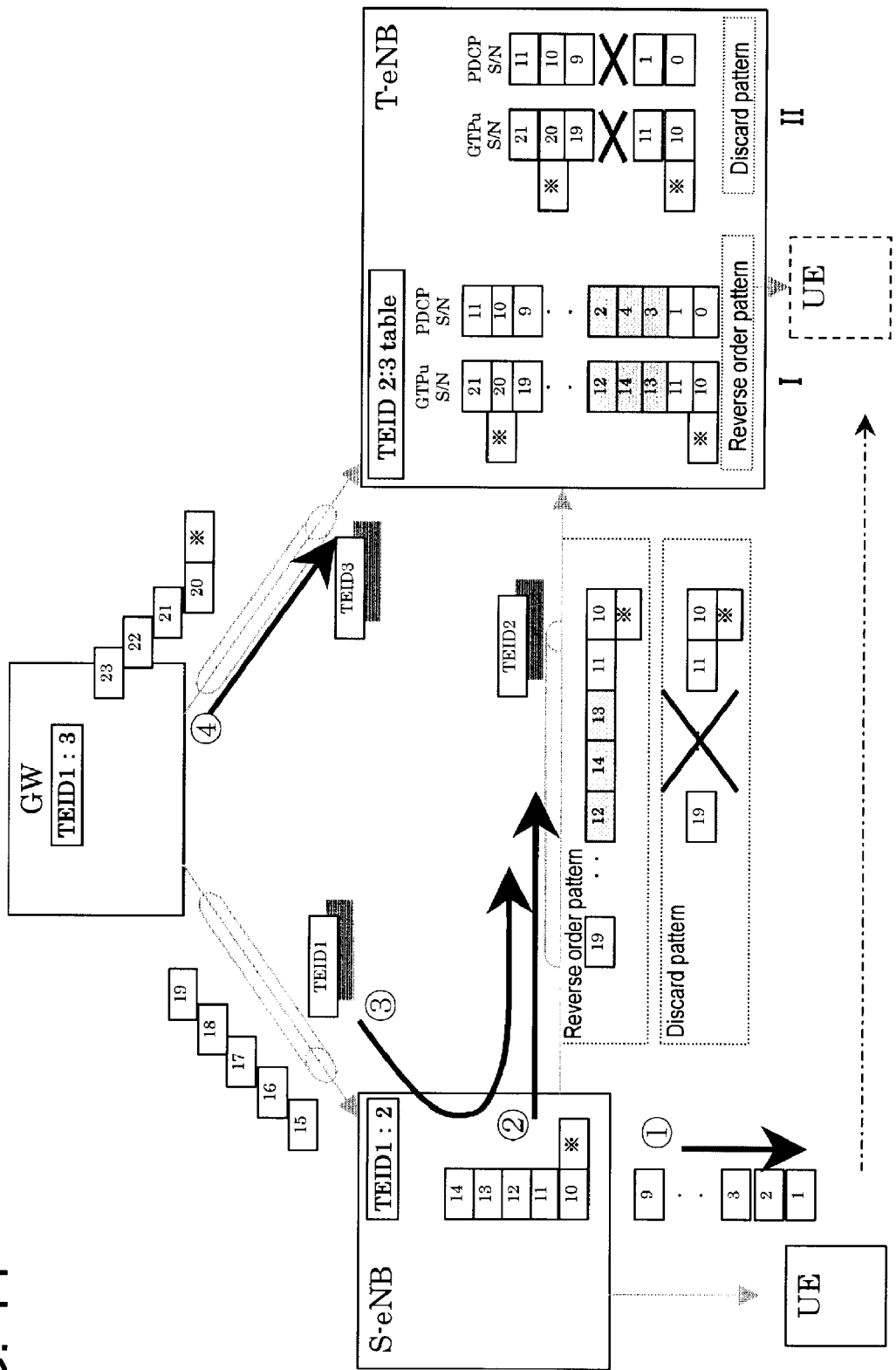
FIG. 11 is a diagram illustrating a packet data flow in the above quasi-normal case.

FIG. 11 is a diagram illustrating a packet data flow in the above quasi-normal case, in which a reverse order pattern (I in FIG. 11) and a discard pattern (II in FIG. 11) are illustrated. As described above, when there is a reverse data order or a discarded packet, it is possible to transmit packets to the user equipment (UE) by skipping a PDCP sequence number to be assigned corresponding to the GTP-U protocol sequence number.

In contrast, if the top data is lost, undesirably, a state of no data transmission to the user equipment (UE) is continued, because of an increased time for waiting the top data (resulting from a loss decision by the expiration of a timer), and because of an unknown top data which makes it impossible to decide the number of an intermediate data from the top of the sequence and accordingly, to assign a PDCP sequence number to the intermediate data concerned.

Due to the above reason, the timing to transmit data to the user equipment (UE) is delayed as a whole. As a second embodiment to solve the above-mentioned inconvenience, transfer order information 13 is assigned as an option to an extension header II in the GTP-U header illustrated in FIG. 4.

Figure 12:
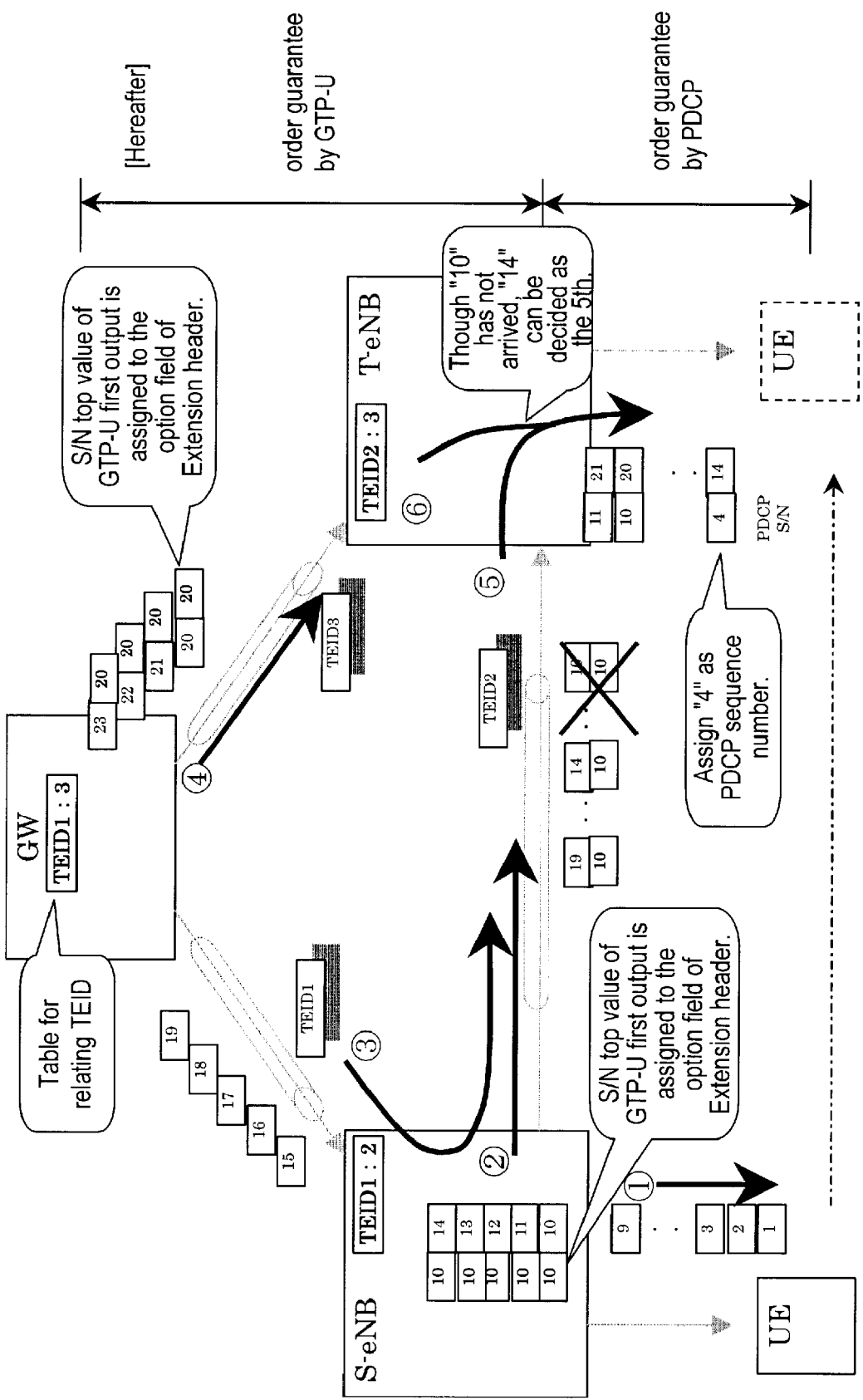
FIG. 12 is a diagram illustrating a packet data flow in the second embodiment.
Figure 13:
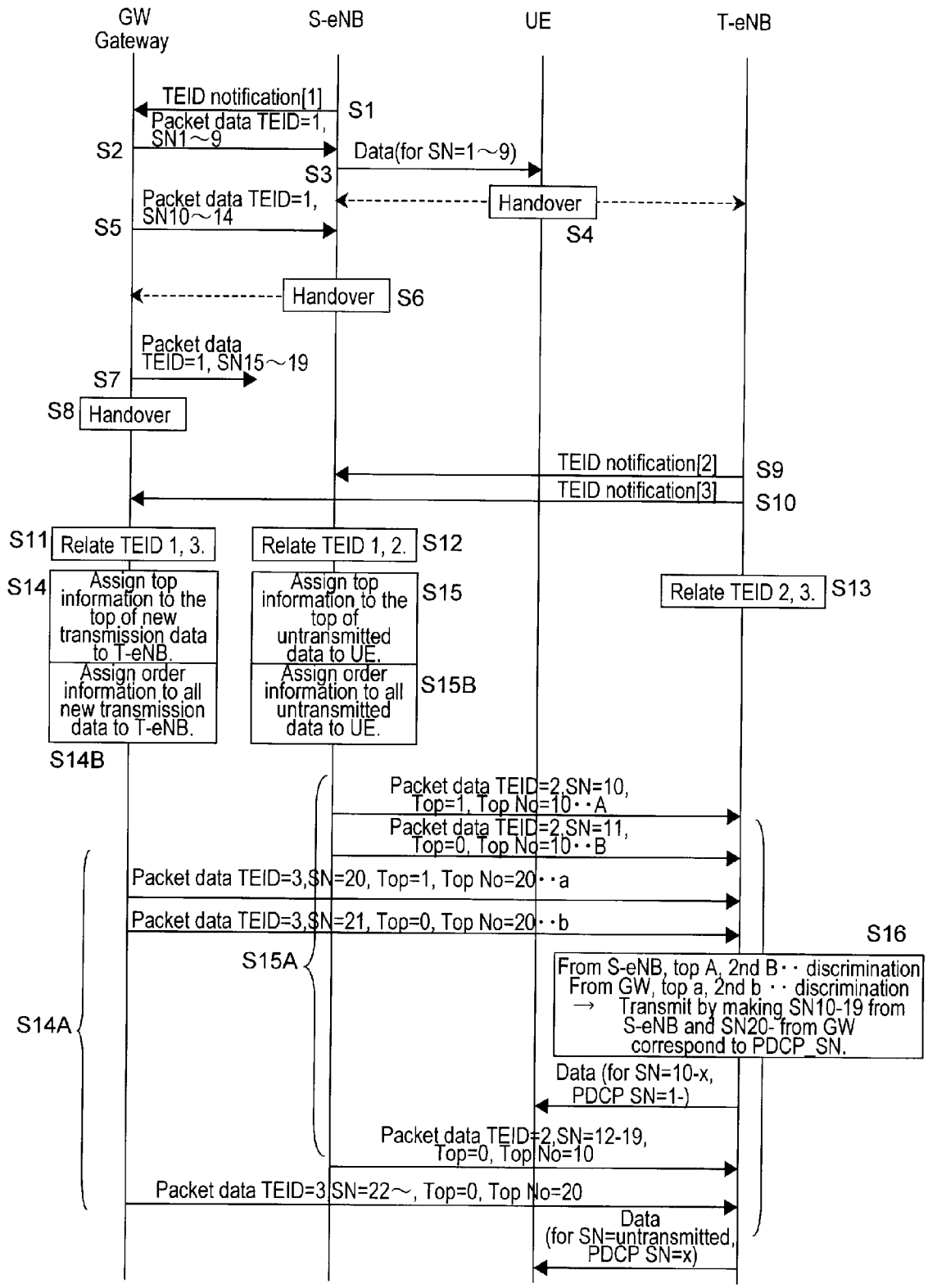
FIG. 13 is a flow diagram illustrating the processing flow corresponding to FIG. 12.

FIG. 12 is a diagram illustrating a packet data flow in the second embodiment. FIG. 13 is a flow diagram illustrating the processing flow corresponding to FIG. 12.

In FIG. 12, in each of the gateway (GW) and the target base station (T-eNB), there is formed a function of assigning the GTP-U sequence number of a transmitted packet to the entire data destined to the target base station (T-eNB).

In the header part illustrated in FIG. 4, the sequence number field of the GTP-U header I, a basic header, has already been used for a genuine sequence number 11. Therefore, the above function is realized by using an option field [16 bits] 13 in the extension header II.

Namely, when a sequence number (11 in FIG. 4) assigned by the GTP protocol is identical to a sequence number (13 in FIG. 4) in the option field, the target base station (T-eNB) decides the packet to be a top packet.

In FIG. 12, the source base station (S-eNB) assigns the GTP-U sequence number [10] of the top packet among consecutive packets (having GTP-U sequence numbers [10]-[19]) to be transmitted to the target base station (T-eNB), to each option field 13 of the extension header II in the entire packets of transmission object.

Meanwhile, the gateway (GW) assigns the GTP-U sequence number [20] of the top packet among consecutive packets (having GTP-U sequence numbers [20]-[23]) to each option field 13 of the extension header II in the entire packets of transmission object.

Among the packets transmitted from the source base station (S-eNB) to the target base station (T-eNB), when a plurality of packets including the top packet do not arrive, the target base station (T-eNB) can decide a packet, which is received first having the GTP-U sequence number [14], to be a fifth packet, by comparing with the sequence number [10] assigned to option field 13, although the top packet having the GTP-U sequence number [10] has not arrived.

Accordingly, in PDCP controller 302, it is possible to transmit to the user equipment (UE) by assigning a PDCP sequence number [5]. It is also possible to process data received from the gateway (GW) in a similar manner.

In the user equipment (UE), even though the PDCP sequence numbers are not received in regular order, there is no problem because an order arrangement function is provided as an inherent function.

As such, according to the second embodiment, although the top packet is obtained in the target base station (T-eNB), it is possible to decide the packet order from the received packet itself, and the packet can be transmitted to the user equipment (UE) together with order information.

FIG. 13 is a processing flow corresponding to FIG. 12.

In the comparison with the processing flow according to the first embodiment illustrated in FIG. 6, first, when assigning top information (by setting bit 12A in FIG. 4 to "1") to the top packet in steps S14 and S15, processing (S14B, S15B) to assign the GTP-U sequence number of the top packet to the entire consecutive packets including the top packet is added.

Corresponding to the above processing, to packets received by the target base station (T-eNB), the sequence number identical to the GTP-U sequence number of the top packet is assigned to option field 13.

Other points are similar to the processing described in FIG. 6.

As having been described, even if the mounting of the PDCP function is shifted from the gateway (GW) to the base station (eNB) according to the 3GPP LTE, it is possible to guarantee the order between the gateway (GW) and the terminal. Further, it is possible to reduce a waiting time timer when data do not arrive in correct order, and accordingly, to reduce a total system delay time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A mobile communication system comprising:
a gateway device;
a source base station and a target base station; and
user equipment configured to receive packet data of packets sequentially transmitted from the gateway device via either of the source base station and the target base station; wherein
at the time of handover processing performed accompanying a movement of the user equipment from the source base station to the target base station, the source base station transfers to the target base station, packet data received from the gateway device, but not yet transmitted to the user equipment, and when transferring the packet data to the target base station, the source base station assigns first transfer start information, which indicates a start of transfer, to a header in a leading packet of the packet data untransmitted to the user equipment, and wherein the gateway device assigns second transfer start information to a header in a leading packet of packet data, which are to be directly transmitted from the gateway device to the target base station, and based on the first and second transfer start information in respective leading packets of the packet data transmitted from the source base station and the gateway device, the target base station recognizes a transmission order of packet data, so as to transmit the packet data received from the source base station and the gateway device in the recognized transmission order to the user equipment.

2. The mobile communication system according to claim 1, wherein the gateway device assigns transfer order information indicating transmission order to the packet data on a packet-by-packet basis, and on receiving each packet from the source base station and the gateway device, if the target base station has not received a packet corresponding to an order earlier than the order of the each received packet obtained from the transfer order information, the target base station preserves the each received packet into a buffer, so as to change reception packet order.

3. The mobile communication system according to claim 2, wherein the target base station recognizes the second transfer start information assigned to the leading packet of the packet data received from the gateway device, and based on the recognized second transfer start information, identifies a last packet of the packet data to be transferred from the source base station.

4. The mobile communication system according to claim 2, wherein the target base station identifies an unreceived packet, based on the transfer order information assigned to the packet data received from the source base station and the upper-level unit.

5. The mobile communication system according to claim 2, wherein the transfer order information is a sequence number in a packet GTP-U header, and the target base station transfers to the user equipment each data packet received from the source base station and the upper-level unit, by making a sequence number in a PDCP header correspond to the sequence number in the GTP-U header of the each received packet data.

6. The mobile communication system according to claim 5, wherein different tunnel IDs are set respectively between the gateway device and the source base station, and between the gateway device and the target base station, and the gateway device sets the sequence number in the each packet GTP-U header so as to maintain continuity over the different tunnel IDs.

7. The mobile communication system according to claim 1, wherein transfer order information indicating transmission order is assigned to each packet by the gateway device, and at the time of handover processing performed accompanying a movement of the user equipment from the source base station to the target base station, the gateway device and the source base station add transfer order information, which is assigned to leading packets respectively having the assigned transfer start information, to the entire packet data, which are transferred to the target base station from the source base station and the gateway device.

8. A mobile communication method in a mobile communication system including a gateway device, a source base station and a target base station, and user equipment configured to receive packet data of packets sequentially transmitted from the gateway device via either of the source base station and the target base station, the mobile communication method comprising:

at the time of handover processing performed accompanying a movement of the user equipment from the source base station to the target base station, transferring by the source base station, to the target base station, packet data received from the gateway device, but not yet transmitted to the user equipment;

when transferring the packet data to the target base station, assigning by the source base station, first transfer start information, which indicates a start of transfer, to a header in a leading packet of the packet data untransmitted to the user equipment;

by the gateway device, assigning the transfer start information to a header in the leading packet of the packet data, which are to be directly transmitted to the target base station; and based on the first and second transfer start information in respective leading packets of the packet data transmitted from the source base station and the gateway device, recognizing by the target base station, a packet data order, so as to transmit the packet data received from the source base station and gateway device in the recognized packet order to the user equipment.

* * * * *